No. 746,954.

Patented December 15, 1903.

UNITED STATES PATENT OFFICE.

WILLIAM D. GILMAN, OF ROLAND PARK, MARYLAND.

PROCESS OF OBTAINING SULFATE OF BARIUM AND CHLORID OF ZINC.

SPECIFICATION forming part of Letters Patent No. 746,954, dated December 15, 1903.

Application filed February 20, 1899. Serial No. 706,219. (No specimens.)

*To all whom it may concern:*

Be it known that I, WILLIAM D. GILMAN, of Roland Park, in the county of Baltimore, and in the State of Maryland, have invented certain new and useful Improvements in Processes of Obtaining Sulfate of Barium and Chlorid of Zinc; and I do hereby declare that the following is a full, clear, and exact description thereof.

The object of my invention has been to provide an improved process of obtaining sulfate of barium and chlorid of zinc; and to this end my invention consists in the process and in the parts thereof as hereinafter specified.

In carrying out my process I first dissolve sulfid of barium in water and then add to such solution a second solution of chlorid of zinc—such, for instance, as that produced by the addition of a sulfate-of-zinc solution to one of chlorid of barium in accordance with my process described in my other pending application for United States Patent, Serial No. 706,218. Upon the addition of the solution of zinc chlorid to that of the barium sulfid an insoluble zinc sulfid is formed, which is precipitated, leaving chlorid of barium in solution in the supernatant liquor. The reaction which takes place is represented by the formula

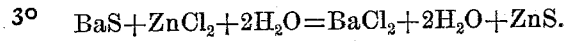

The liquor containing the barium chlorid is then separated from the precipitated zinc sulfid and is treated with a solution of sulfate of zinc, which causes the formation of barium sulfate, which, being insoluble, is entirely precipitated out of solution, and chlorid of zinc, which, being freely soluble in water, remains in solution in the supernatant liquor. The reaction taking place upon the addition of the solution of sulfate of zinc to the liquor containing the barium chlorid in solution is represented by the formula

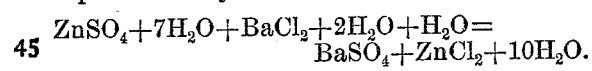

The precipitate and resultant solution are then separated, and the precipitate, in the form of sulfate of barium, is washed with water to remove any of the solution of chlorid of zinc remaining among its particles, and where the chlorid of zinc is desired in dry form the water of the resultant solution containing it is removed from it by evaporation or any of the well-known drying processes.

The result of the operation of my process is then pure sulfate of barium and pure chlorid of zinc, both substances valuable and in much demand and commanding a ready sale in the market.

It has been found in practice that the chlorid of zinc produced by simple evaporation or concentration of the zinc-chlorid solution which applicant makes is not only absolutely pure, but is procured in a crystalline form instead of in that in which zinc chloride has been heretofore put on the market—that is, in a fused mass.

Having thus described my invention, what I claim is—

1. The process of obtaining sulfate of barium and chlorid of zinc, which consists first in bringing together barium sulfid and zinc chlorid in solution; then separating the barium-chlorid solution from the precipitate; then mixing the latter solution and a solution of zinc sulfate, thus precipitating barium sulfate, and then removing the zinc chlorid from the supernatant solution.

2. The process of obtaining sulfate of barium and chlorid of zinc, which consists first in bringing together barium sulfid and zinc chlorid in aqueous solution; then separating the barium-chlorid solution from the precipitate; then mixing the latter solution and an aqueous solution of zinc sulfate, thus precipitating barium sulfate, and then removing the zinc chlorid from the supernatant solution.

In testimony that I claim the foregoing I have hereunto set my hand this 11th day of January, A. D. 1899.

WILLIAM D. GILMAN.

Witnesses:
HENRY C. HAZARD,
W. E. WRIGHT.